United States Patent
Yun et al.

(10) Patent No.: US 9,301,223 B2
(45) Date of Patent: Mar. 29, 2016

(54) METHOD AND SYSTEM FOR AUTOMATIC NEIGHBOR RELATIONS IN MULTI-VENDOR HETEROGENEOUS NETWORK

(71) Applicant: EDEN ROCK COMMUNICATIONS, LLC, Bothell, WA (US)

(72) Inventors: Jungnam Yun, Bothell, WA (US); Eamonn Gormley, Bothell, WA (US)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/327,734

(22) Filed: Jul. 10, 2014

(65) Prior Publication Data

US 2015/0079990 A1   Mar. 19, 2015

Related U.S. Application Data

(60) Provisional application No. 61/877,845, filed on Sep. 13, 2013.

(51) Int. Cl.
 *H04W 36/00* (2009.01)
(52) U.S. Cl.
 CPC .................................. *H04W 36/0083* (2013.01)
(58) Field of Classification Search
 CPC ................................................. H04W 36/0083
 See application file for complete search history.

(56) References Cited

U.S. PATENT DOCUMENTS

| | | | |
|---|---|---|---|
| 7,957,740 B2 | 6/2011 | Yoon | |
| 2008/0194223 A1* | 8/2008 | Overby | 455/404.1 |
| 2009/0201884 A1 | 8/2009 | Chaponniere | |
| 2011/0223929 A1 | 9/2011 | Boudreau et al. | |
| 2011/0244869 A1* | 10/2011 | Olofsson et al. | 455/442 |
| 2011/0269426 A1* | 11/2011 | Hultin et al. | 455/411 |
| 2012/0100884 A1* | 4/2012 | Radulescu et al. | 455/524 |
| 2012/0315900 A1* | 12/2012 | Wen | 455/434 |
| 2012/0322436 A1* | 12/2012 | Asado | 455/422.1 |
| 2013/0084910 A1* | 4/2013 | Suzuki et al. | 455/515 |
| 2014/0073306 A1* | 3/2014 | Shetty et al. | 455/418 |
| 2014/0128086 A1* | 5/2014 | Gunnarsson et al. | 455/450 |
| 2014/0274029 A1* | 9/2014 | Radulescu et al. | 455/424 |
| 2014/0335874 A1* | 11/2014 | Bakker et al. | 455/450 |
| 2014/0349661 A1* | 11/2014 | Nuss et al. | 455/450 |

FOREIGN PATENT DOCUMENTS

KR   10-2010-0005498 A   1/2010

OTHER PUBLICATIONS

International Search Report and Written Opinion for PCT/US2014/046091, filed Jul. 10, 2014.

\* cited by examiner

*Primary Examiner* — Nathan Mitchell

(57) ABSTRACT

A method includes comparing a vendor of a base station of the source cell to a vendor of the a base station of the target cell, when the vendor of the base station of the source cell is different from the vendor of the base station of the target cell, determining a second cell identifier used by the vendor of the base station of the target cell to identify the target cell, comparing the second cell identifier to a first cell identifier used by a vendor of the source base station to identify the target cell, and replacing one of the first and second cell identifiers with the other of the first and second cell identifiers.

20 Claims, 6 Drawing Sheets

PCI Confusion

TAC Mismatch

METHOD AND SYSTEM FOR AUTOMATIC NEIGHBOR RELATIONS IN MULTI-VENDOR HETEROGENEOUS NETWORK

CROSS-REFERENCES TO RELATED APPLICATIONS

The present invention claims priority to U.S. Provisional Application No. 61/877,845, filed Sep. 13, 2013, which is incorporated by reference herein for all purposes.

BACKGROUND

In cellular heterogeneous networks with 2G, 3G and 4G cells, neighboring cell information for handover processes is stored and maintained in neighbor relation tables (NRTs). Automatic neighbor relation (ANR) functions automate the management and optimization of the NRT for each cell. An initial NRT can be obtained from centralized self-organized network (SON) element manager (EM) or network manager (NM), or alternatively a base station (e.g. an eNodeB) may create the initial NRT for itself utilizing the network listening mode. Once the base station is in operation, the NRT is continuously updated based on UE measurements from handover activities.

Geographically predicted NRTs generally have incorrectly prioritized neighbor lists because of differences in the actual RF propagation environment compared to the predicted environment. Additionally, networks continually evolve with the addition of new cells including both small and large area cells due to operations such as cell splitting. For these reasons ongoing optimization of NRTs via SON automated functions is used for heterogeneous networks (HetNets).

In the past, operators have deployed base stations from different vendors in geographically separated areas. Cross-vendor neighbor list optimization is therefore employed at the boundary of network areas. This has conventionally involved manual steps because ANR solutions have operated against network equipment from a single vendor. However, as the network deployments evolve to heterogeneous networks encompassing small cells and macro cells in the same network area, operators can benefit from solutions for maintaining optimized neighbor relations between base stations from different vendors throughout the network area.

BRIEF SUMMARY

In an embodiment, a method for a cellular network includes comparing a vendor of a base station of the source cell to a vendor of the a base station of the target cell, when the vendor of the base station of the source cell is different from the vendor of the base station of the target cell, determining a second cell identifier used by the vendor of the base station of the target cell to identify the target cell, comparing the second cell identifier to a first cell identifier used by a vendor of the source base station to identify the target cell, and replacing one of the first and second cell identifiers with the other of the first and second cell identifiers. The method may further include comparing a level of handover failures from a source cell to a target cell to a predetermined value, wherein determining the second cell identifier is only performed when the level of handover failures is at least the predetermined value.

Determining the second cell identifier may be performed at a predetermined time interval, and the predetermined value may be 100%. The first and second cell identifiers may be Tracking Area Codes (TACs) or Physical Cell Identifiers (PCIs). Replacing one of the first and second cell identifiers may include replacing a TAC used to identify the target cell by the vendor of the source cell with a TAC used to identify the target cell by the vendor of the target cell, or replacing one of the first and second cell identifiers may include replacing a PCI used to identify the target cell by the vendor of the target cell.

In an embodiment, the method further includes transmitting a request for the second cell identifier from a network management system to an element management system managing the target base station, wherein the first cell identifier is compared to the second cell identifier by a network management system. The method may further include determining whether a change was made to the target base station within a previous time interval, wherein determining the second cell identifier and comparing the second cell identifier to the first cell identifier are only performed when changes were made to the target base station within the previous time interval. When the first and second cell identifiers are TACs the change may include resetting the target base station. When the first and second cell identifiers are PCIs the change may include installing the target base station.

In an embodiment, the method further comprises determining whether the target cell has a lesser coverage area than a macro cell, wherein determining the second cell identifier and comparing the second cell identifier to the first cell identifier are only performed when the target cell has a lesser coverage area than a macro cell. When the level of handover failures is 100%, the first and second cell identifiers may be TACs, and when the level of handover failures is less than 100%, the first and second cell identifiers may be PCIs.

DETAILED DESCRIPTION

Figure 1:
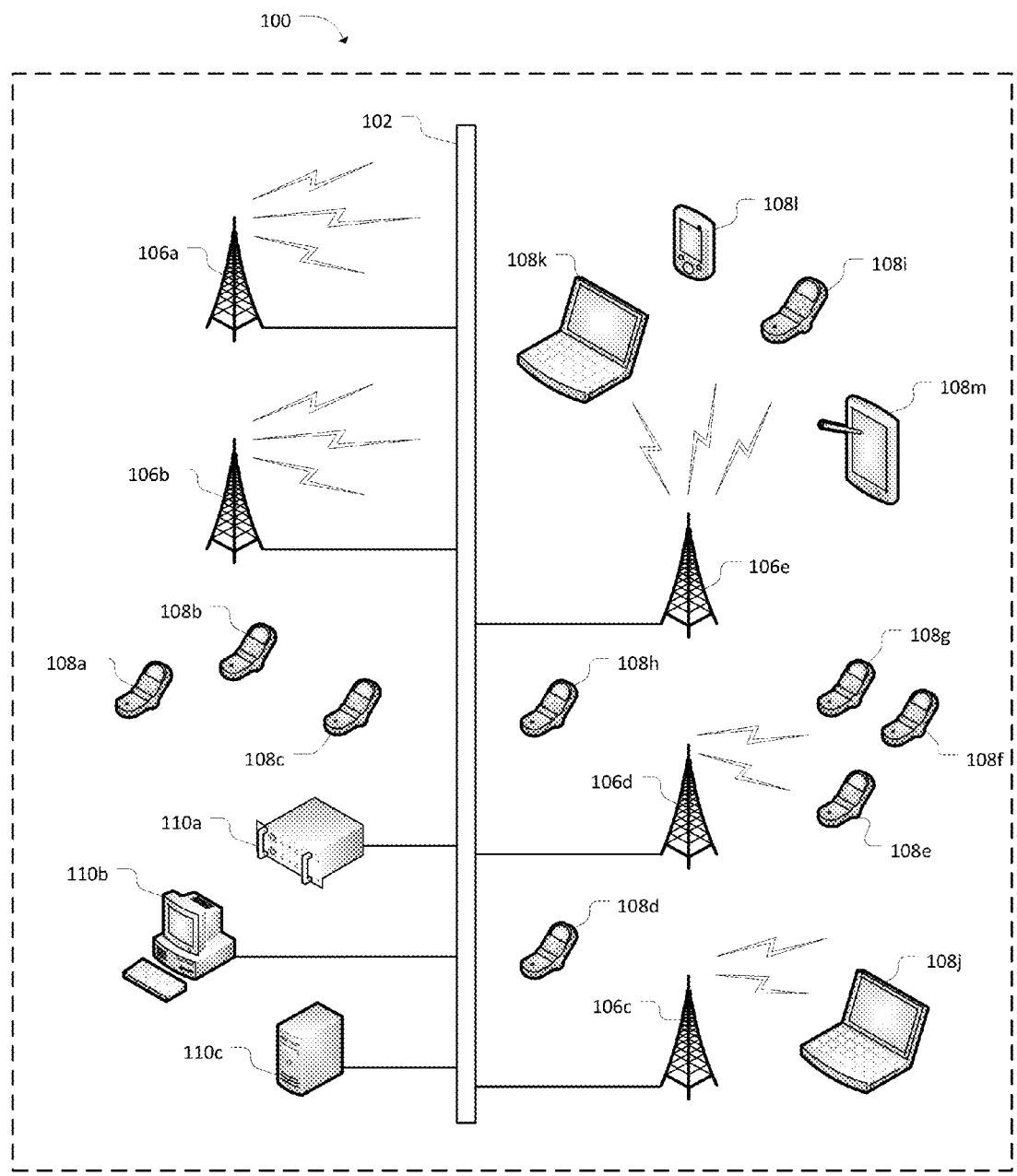
FIG. 1 illustrates a wireless communication system according to an embodiment.

Embodiments of the present disclosure relate to automatic neighbor relation (ANR). The specific embodiments that are described are consistent with a Heterogeneous Network (HetNet) using the LTE standard. However, it should be understood that aspects of this disclosure apply more generally to network technologies that use identifiers for transceiver nodes.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 illustrates a networked computing system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations may include macrocells, microcells, picocells, and femtocells.

In a system 100 according to an embodiment, the data communications network 102 may include a backhaul portion that can facilitate distributed network communications between any of the network controller devices 110 a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. Examples of network controller devices include Network Management Systems (NMSs) and Element Management Systems (EMSs). The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100.

In an embodiment, any of the network controller devices 110a-c and/or base stations 106a-e may function independently or collaboratively to implement processes associated with various embodiments of the present disclosure.

In accordance with a standard GSM network, any of the network controller devices 110a-c (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
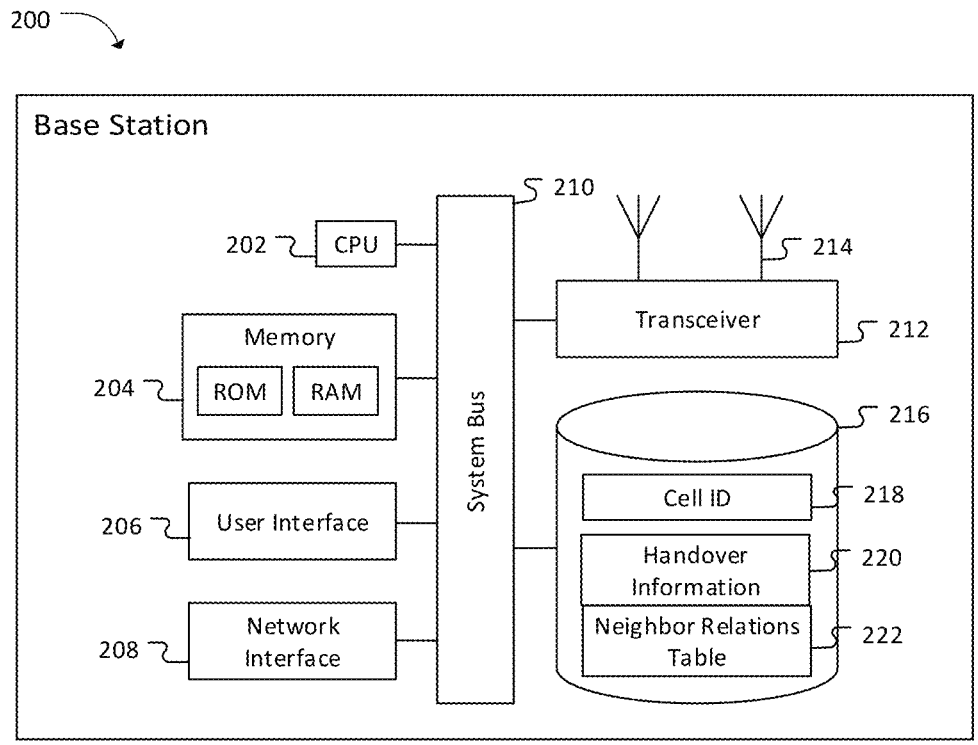
FIG. 2 illustrates a base station according to an embodiment.

FIG. 2 illustrates a block diagram of a base station 200 (e.g., a femtocell, picocell, microcell or macrocell) that may be representative of the base stations 106a-e in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

Base station 200 may include a user interface 206 for inputting and retrieving data to and from the base station by operator personnel, and a network interface coupled to a wireline portion of the network. In an embodiment, the base station 200 may send and receive data to and from other network elements through network interface 208. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data storage 216 and CPU 202 which executes the program. In an embodiment, data storage 216 may store a Cell ID 218, handover information 220, and neighbor relations table 222. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with UEs 108a-m via any Cellular Data Communications Protocol, including any common GSM, UMTS, WiMAX or LTE protocol.

Figure 3:
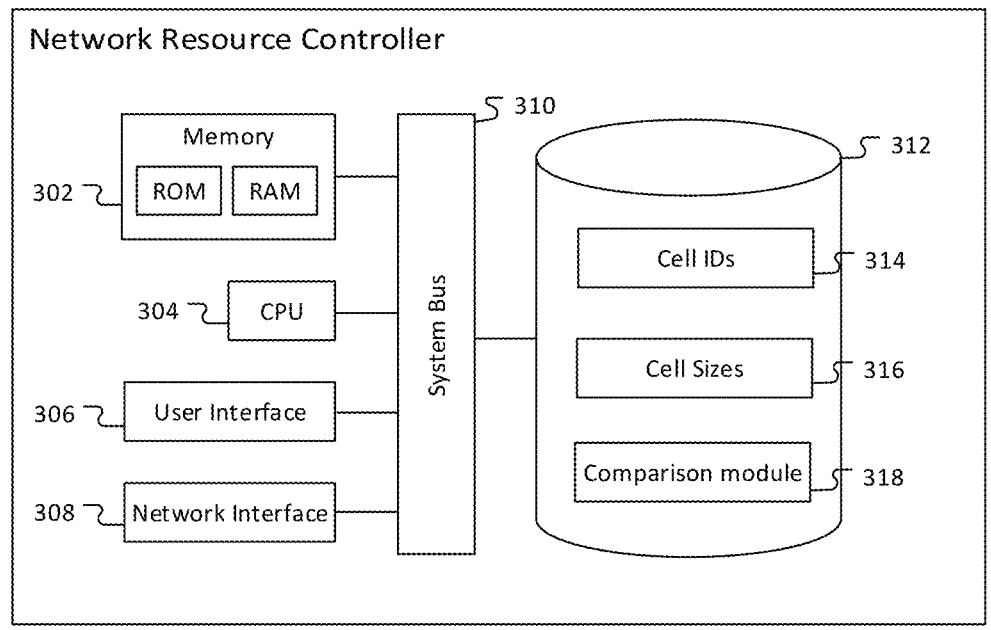
FIG. 3 illustrates a network resource controller according to an embodiment.

FIG. 3 illustrates a block diagram of an NRC 300 that may be representative of any of the network controller devices 110a-c. Accordingly, NRC 300 may be representative of a Network Management System (NMS) or an Element Management System (EMS). In an embodiment, one or more of the network controller devices 110a-c are SON controllers. The NRC 300 includes one or more processor devices including a CPU 304.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may store, for example, cell IDs 314, cell sizes 316, and a comparison module 318.

The NRC 300 may also include a user interface 306 that allows an administrator to interact with the NRC's software and hardware resources and to display the performance and operation of the networked computing system 100. In addition, the NRC 300 may include a network interface 306 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

Figure 4:
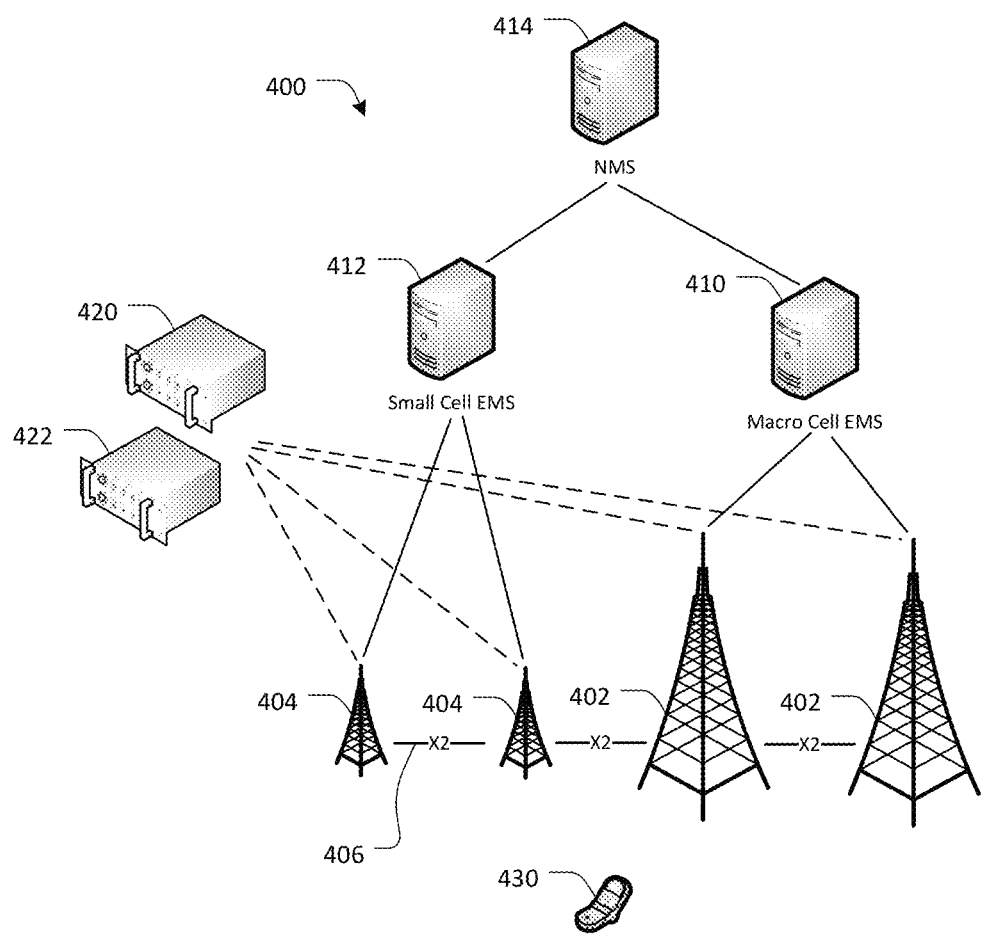
FIG. 4 illustrates a heterogeneous network according to an embodiment.

FIG. 4 shows an example of a heterogeneous network (HetNet) 400. HetNet 400 has a multi-layer network topology in which macro cells 402 provide larger coverage areas, and smaller cells 404 such as micro, pico, and femto cells provide smaller areas of coverage and increase the overall capacity of the network. In a HetNet, operators typically deploy equipment from a plurality of different vendors.

In HetNet 400 of FIG. 4, a plurality of large cells 402 and small cells 404 communicate wirelessly with attached user equipment. In an LTE system, each of the large cells 402 and small cells 404 may communicate directly with one another through an X2 interface 406. User equipment 430 may be coupled to any of the small cells 402 or macro cells 404.

One or more large cell 402 is managed by a macro cell Element Management System (EMS) 410, while one or more small cell 404 is managed by a small cell EMS. Macro cell EMS 410 and small cell EMS 412 are both coupled to Network Management System (NMS) 414, which may be a centralized SON server that manages SON operations for a sector of a network. Each of the base stations 404 and 402 are coupled to a System Architecture Evolution (SAE) Evolved Packet Core (EPC) through Mobility Management Entity (MME) 420 and Serving Gateway 422.

As User Equipment (UE) 430 moves through HetNet 400, it monitors signal quality of a signal to its serving cell. If the signal quality drops below a threshold value, then UE 430 initiates a handover process to handover to a cell with higher signal quality. As UE 430 moves through the coverage area of a macro cell 402, it may detect small cells 404 and macro cells 402. In some circumstances, a macro cell 402 may be detected for a relatively brief period of time, such as when a narrow line of sight is defined by a metropolitan corridor. Similarly, the UE may pass by a relatively large number of small cell 404 coverage areas in, for example, a congested metropolitan area. Thus, the UE may be exposed to a substantial number of cells that are candidates for handover operations.

When the network area is a HetNet, the cells encountered by a UE may be controlled by different EMSs, such as small cells 404 being controlled by small cell EMS 412, and macro cells 402 being controlled by macro cell EMS 410 in FIG. 4. When changes are made to the configuration of network equipment such as base stations, those configuration changes may not be acknowledged by equipment that is controlled by a different EMS. For example, neighbor relations data such as an updated Tracking Area Code (TAC) may not propagate to neighboring cells correctly. As a result, errors such as handover failures due to mismatched TACs in Neighbor Relations Tables may occur.

In an LTE system, Physical Cell Identifiers (PCI) are used by base stations to identify other base stations for Automatic Neighbor Relation purposes. The LTE standard recognizes 504 separate PCI designations which are re-used throughout the network. Each base station stores a list of PCIs in a Neighbor Relations Table (NRT) in which a PCI is associated with an ECGI. The ECGI is a unique identifier for a base station, and the combination of the ECGI and PCI stored in the NRT is referred to as a Target Cell Identifier (TCI).

Figure 5A:
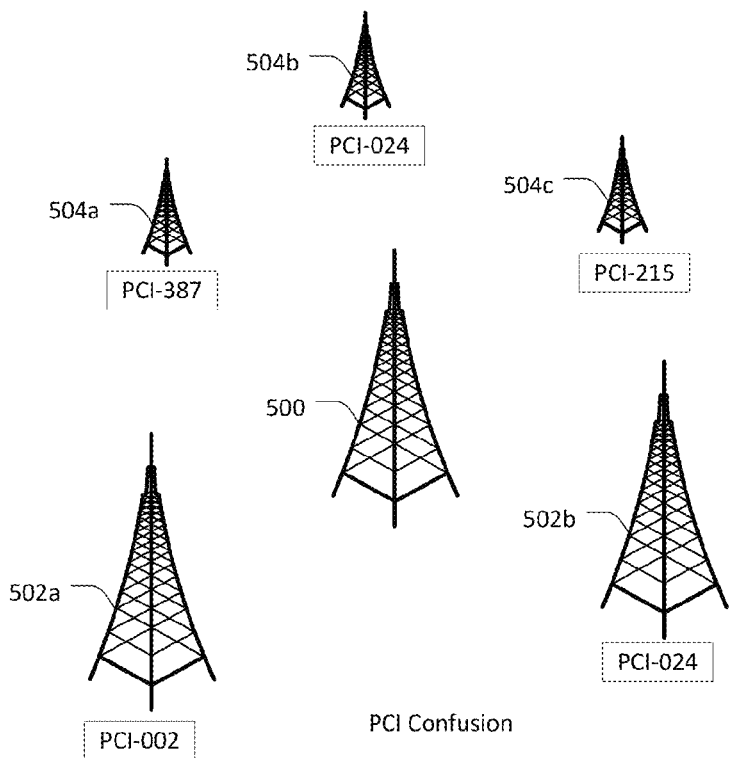
FIG. 5A illustrates an example of PCI confusion in a network.

FIG. 5A shows an embodiment of a cellular network in which a base station 400 has two neighboring macro cell base stations 502a and 502b, and three neighboring small cell base stations 504a, 504b and 504c. A small cell base station may be a base station for a smaller cell than a macro cell, such as a pico cell or a micro cell. PCIs for each of the base stations are also indicated in the figure, which shows that macro cell base station 502b shares the same PCI designation as small cell base station 504b. For simplicity, FIG. 5A only shows one PCI for each base station. However, because each base station may be associated with a plurality of cells, a plurality of PCIs may be associated with each base station.

An EMS that controls a cell may assign a PCI to that cell with or without being aware that the same PCI appears on the NRT of a neighboring cell. When a macro cell has two occurrences of a PCI in its NRT, the macro cell may request UE to read and report ECGIs associated with the PCI in question. However, such a process uses layer-1 control signaling and introduces delays to the handover procedures, which may lead to higher handover rates.

If ECGI report is not mandated during a handover procedure, handover failures may occur if PCI values are not associated with the correct ECGI values in the NRT table or due to the recurrence of the same PCI designation in neighboring cells of a base station 500. In an LTE network, UE associate Reference Signal Received Power (RSRP) values with PCI designations, but do not typically associate RSRP with ECGI. Thus, a handover may be initiated to the "wrong" destination cell when the source cell is not aware of which of the two cells using the same PCI is associated with the RSRP values.

Such a scenario may be referred to as a PCI conflict or PCI confusion, or more generally a cell ID discrepancy. One potential cause of PCI confusion is when an Element Management System (EMS) that controls a small cell base station 504 creates a PCI with or without being aware that the same PCI is already a potential handover target for a base station within the vicinity of the base station associated with the created PCI. Some vendors have established processes for resolving PCI confusion, but the processes are not applicable when the vendor of the base station with the duplicate PCI is different from the vendor of the equipment associated with the original PCI.

Figure 5B:
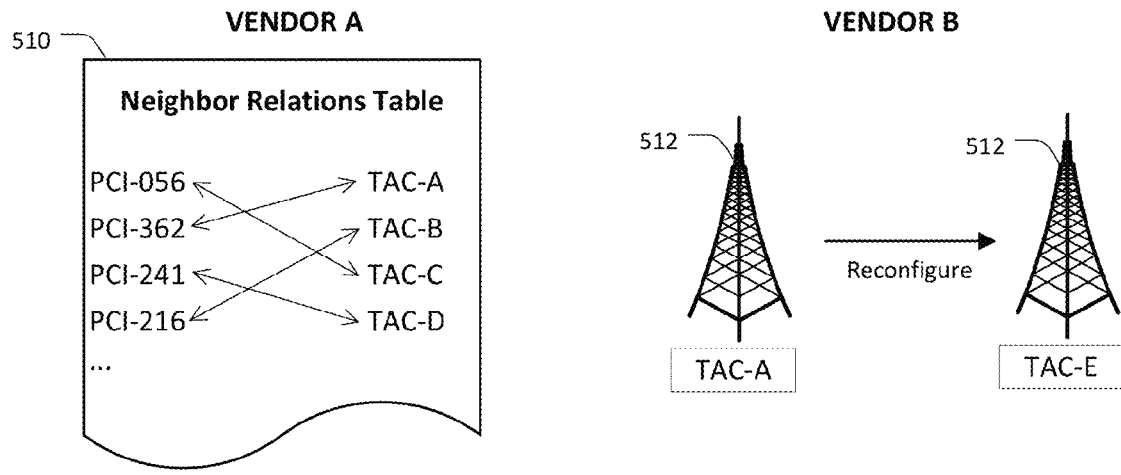
FIG. 5B illustrates an example of TAC mismatch in a network.

FIG. 5B shows a neighbor relations table 510 maintained by a first vendor "A" which includes associations between PCIs and ECGIs and other IDs such as TAC and PLMN IDs. The TAC associated with the second vendor's base station 512 ("TAC-A") may change when the base station 512 is reconfigured. However, it is possible that this change is not communicated from the second vendor to the first vendor. As a result, the first vendor's NRT 510 is not updated to reflect the changed TAC, which can prevent successful handovers from the first vendor's equipment to base station 512. A scenario in which the TAC in a first vendor's NRT does not match the TAC of the associated base station may be referred to in this document as TAC mismatch, or more generally a cell ID discrepancy.

Figure 6:
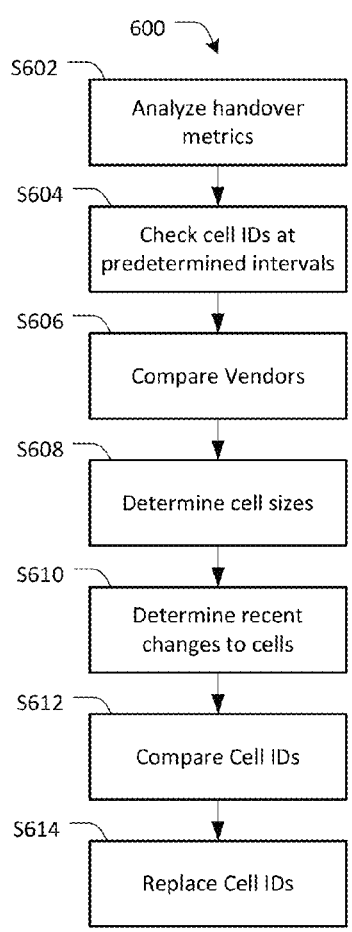
FIG. 6 illustrates an embodiment of an automated relations process for a multi-vendor heterogeneous cellular network.

FIG. 6 shows an embodiment of an automated relations process 600 for a multi-vendor heterogeneous cellular network. Process 600 may be used to discover and resolve cell ID discrepancies between entities in a cellular network. Although this and other methods are described with respect to the 3GPP LTE standard, features of the described methods may be applied to other technologies as well.

At S602, metrics associated with handovers from a source cell to a target cell are analyzed. Analyzing handover metrics S602 may include measuring the rate of handover success or failure over a period of time and comparing the rate to a predetermined value. The analysis of S602 may be used to identify issues related to ANR in a cellular network, and S602 may be used in conjunction with other processes to identify potential causes of handover failures. Analyzing handover metrics S602 is explained in greater detail with respect to FIG. 7 and process 700 below.

A timer running in the system may trigger checking cell IDs stored by network equipment at S604. At each time interval, an entity such as a NMS may receive data from a plurality of EMSs in a network to determine which cell IDs are stored at the various EMSs. The cell IDs may be compared to one another in order to discover discrepancies between the IDs stored by various network elements. Aspects of S604 are explained in greater detail below with respect to FIG. 8 and process 800.

A vendor of the first network equipment may be compared to a vendor of a second network equipment at S606. As discussed above, discrepancies between cell IDs are expected to be higher when the vendors of the entities storing the cell IDs are different. Many vendors of network equipment have solutions for identifying and resolving discrepancies between cell IDs, and for preventing them from occurring in the first place. However, those solutions do not generally apply to equipment that is from a different vendor. Accordingly, comparing vendors S606 may identify cells with relatively high probabilities of being responsible for cell ID discrepancies.

In an embodiment, comparing vendors of network equipment S606 may be performed by a network management system. For example, with respect to FIG. 4, a NMS 414 may determine the vendor of macro cell 402, determine the vendor of small cell 404, and compare the two vendors. If the vendors do not match, then subsequent processes may be performed to identify discrepancies in cell IDs. If the vendors match, then in an embodiment no further processing is performed to identify a cell ID mismatch between the macro cell 402 and the small cell 404. NMS 414 may determine vendors, for example by transmitting a request and receiving a response for a vendor identity from each EMS 412 and 410, or by reading vendor information from a database of the NMS.

The relative sizes of cells may be determined at S608. In an embodiment, aspects of process 600 may be limited to situations where the source cell is a macro cell 402 and the target cell is a small cell 404.

Technologies such as SON in LTE provide for a relatively large number of nodes in a network system. As wireless communications become more commonplace, more small coverage area cells are being installed and maintained in high density areas. In some situations, small cells may be installed by ordinary users without access to network information and tools that are available to vendors of macro cells. Smaller cells are more likely to be responsible for pop-up and disappear situations that thwart conventional ANR processes. In addition, smaller cells may have more reliability issues, leading to more frequent resets and replacements which could result in revised cell IDs.

For these or other reasons, S608 may be performed to focus aspects of process 600 on relationships between a macro cell and a small cell. For example, S608 may be performed in conjunction with S602 to limit subsequent analysis to relationships in which a source cell for a handover is a macro cell and a target cell is a small cell. Similarly, S608 may be performed in conjunction with comparing cell IDs at S612 to limit the comparisons performed to comparisons between macro and small cells. Determining cell sizes S608 may include, for example, an NMS 414 requesting cell sizes from EMSs 412, or an NMS reading cell size information from a database in the NMS or some other location in the system.

In an embodiment, the occurrence of recent changes to cells is determined at S610. Recent changes within the scope of S610 include whether a base station serving the cell has been recently reconfigured, serviced, or installed. When a base station is reconfigured, it may generate a new TAC value, resulting in handover failures from source cells that are not aware of the new TAC. Similarly, when a new cell is installed in a network, its cell identifiers may not be known to a source cell or may cause a conflict with an existing cell identifier such as a PCI stored in a neighbor list of the source cell.

Determining recent changes S610 may be performed, for example, by reading a change log associated with a cell at a base station, an EMS, or an NMS. In another embodiment, determining a recent change includes determining an installation time for a cell and comparing that to a predetermined past time. A skilled artisan will recognize that various data in a system can be analyzed to determine whether recent changes have been made to a base station of the network.

S610 may be performed in conjunction with other aspects of process 600. For example, a recent change to a target cell determined at S610 may be correlated with a time at which handovers to the target cell began to occur. Similarly, the time period for which recent changes are determined may be set to correspond to the predetermined interval at which cell IDs are checked at S604. In other embodiments, S610 may not be performed at all.

Cell identities are compared at S612. In one embodiment, the PCI-ECGI associated with the target base station that is stored at the source base station is compared to the PCI-ECGI that is being used by the target base station. In another embodiment, the TAC associated with the target cell that is used by the source base station is compared to the TAC that is used by the source base station. If the identities match, then the system may determine that no cell identity discrepancies are present between the source and target cells.

If the cell identities do not match, a cell identity may be replaced at S614. If the TCI values do not match, S614 may include replacing the TCI value of the cell in the NRT. If there are multiple cells with the same PCI value in the neighborhood of a source cell (e.g. multiple cells with same PCI value being detected in the cell), in an embodiment, an NMS may instruct the EMS that manages one of the cells corresponding to the duplicated PCI value to choose a new PCI value. In an embodiment, the NMS instructs the EMS to choose a new PCI value that does not conflict with any PCI values that are currently designated for neighbors of the source base station.

The NMS may transmit a NRT of the source cell to the EMS or the target base station to avoid new conflicts. In another embodiment, the NMS may choose a PCI value using network planning tools, and apply that PCI value to the NRT of the target base station directly or indirectly through an EMS. In the event that it is not possible to assign a PCI value that does not result in a conflict, for example because of high network density, then the system may assign a duplicate PCI to a small cell so that PCI reuse is more prevalent among small cells. In this event, user equipment reads and reports the ECGI along with PCI when handover occurs.

If S612 determines that the ECGI value of the target cell does not match the value stored in the NRT at the source cell for the target cell, then the ECGI value stored in the NRT at the source base station is replaced with the ECGI value that is currently being used by the target cell. In addition, if S612 determines that the TAC value of the target cell does not match the value stored in the NRT at the source cell for the target cell, then the TAC value stored in the NRT at the source base station is replaced with the TAC value that is currently being used by the target cell.

Figure 7:
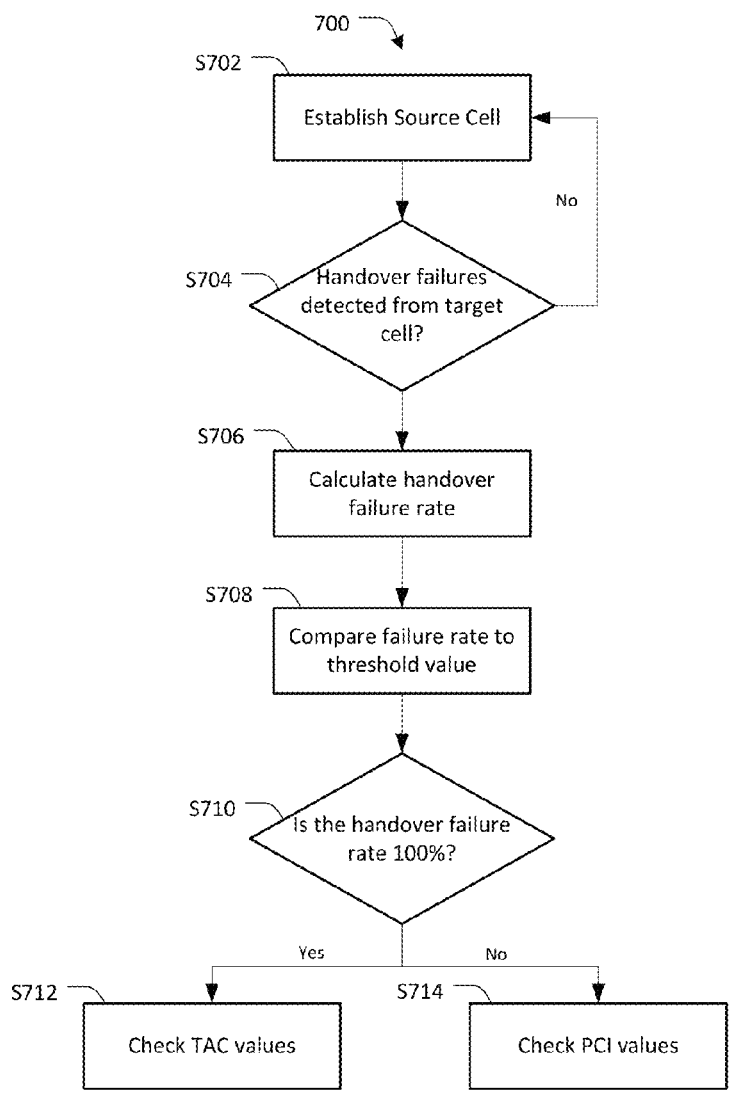
FIG. 7 illustrates an embodiment of a process for analyzing handover metrics.

FIG. 7 illustrates a process 700 of analyzing handover metrics, which corresponds to S602 of process 600. At S702, the system establishes a particular source cell. In an embodiment, the source cell is selected from macro cells of the network. The handover metrics may be for hard handovers, soft handovers, or both.

At S704, the system determines whether handover failures have been detected from the source cell within a recent time period. In various embodiments, the time period may be, for example, 10 minutes, one hour, or one day. If no handover failures are detected for a given source cell, then the process returns to S702 to select a different source cell. After all cells in the network have been analyzed, the system may wait for a predetermined time period before reinitiating process 700.

At S706, the system calculates handover failure rates between the source cell and each target cell to which handover failures were recorded. The failure rates are calculated for a prior time period, and may be determined on a percentage basis, e.g. X % of handovers from the source cell to a target cells failed within a time period T. In an embodiment, time period T is a predetermined time period between a first time and a current time. In another embodiment, time period T is a time between a first time and a second time, both of which are in the past.

In still another embodiment, time period T may be adjusted according to handover data. For example, consider a scenario in which the time period T is 24 hours. In such an embodiment, the source cell may record no handover failures from the source cell to a target cell within the first 12 hours of the time period and a 100% failure rate for the last 12 hours of the time period. Such a scenario is possible when a change event such as resetting the target base station is the cause of handover failures, and the target base station was reset at the 12 hour mark. In such an embodiment, the time period may be truncated to a time of the first failure in the time period, and the failure rate is calculated from that point forward. Thus, in embodiments, the prior time period T may be adjusted based on the handover data.

The handover failure rate is compared to a threshold value at S708. If the handover failure rate is less than the threshold value, then process 700 may return to S702 without taking further action. If the failure rate exceeds the threshold value, then additional processes are performed to identify and resolve discrepancies between cell IDs. Non-limiting examples of possible threshold values include 20%, 35%, and 50%.

At S710, the system may determine whether the handover failure rate is 100%. S710 may be performed in conjunction with S708, in place of S708, or not performed at all in various embodiments.

When the TAC of target cell ID in the NRT of the source cell does not match the TAC of the target cell, all handover attempts from the source to the target may fail. Thus, when the handover failure rate equals 100%, TAC values may be compared as described above with respect to S612. In contrast, discrepancies between PCI values may result in a fraction of handovers failing, so when the handover failure rate is less than 100%, PCI values may be compared at S714.

In an embodiment, the result of S710 may determine the order in which cell ID checks are performed. For example, if the rate is less than 100%, then PCI values may be compared first, and if no mismatch is detected, TAC values are compared.

Figure 8:
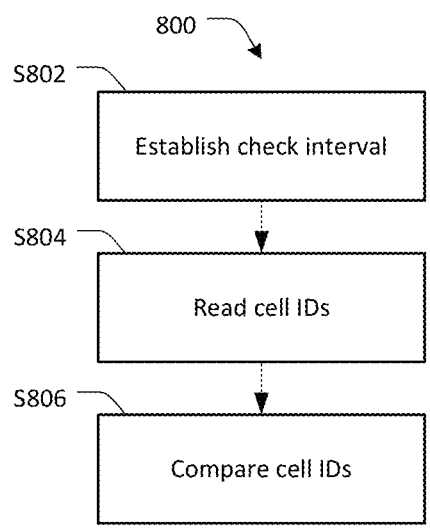
FIG. 8 illustrates an embodiment of a process for timed checks.

FIG. 8 shows a process 800 for performing timed checks according to an embodiment. Process 800 corresponds to S604 of process 600.

At S802, a checking interval is determined. Checking cell IDs may use control signaling which causes delays in a system. Therefore, the check interval may be established as long enough to prevent excessive system delays, and short enough to resolve issues in a timely manner Examples of check intervals include 10 minutes, 60 minutes, and 24 hours.

At S804, cell IDs such as TACs and PCIs are read for a plurality of cells in a network. For example, an NMS may receive NRTs from all macro cells and cell IDs used by each cell in a network. In an embodiment, the NMS may only receive NRTs of macro cells and cell IDs of small cells. In another embodiment, the NMS may only receive cell IDs of cells that have been changed in a recent time period. Thus, in various embodiments, S800 may be performed along with other aspects of process 600.

At S806, the cell IDs used by the cells are compared to the cell IDs on the NRTs. S806 corresponds to S612, which is explained in more detail above. If a discrepancy between cell IDs is detected, then aspects of process 600 may be performed to resolve the discrepancy.

Although specific embodiments have been described above, these embodiments are provided to enable and support the following appended claims, and the scope of the claims are not limited to the specific examples provided above. For example, in one embodiment, certain information such as cell IDs may be exchanged over an X2 interface. Persons of skill in the art will recognized that other embodiments are possible.

What is claimed is:

1. A method for improving performance of a heterogeneous cellular telecommunications network in which a Network Management System (NMS) is coupled to a first Element Management System and a second EMS, the method comprising:
    transmitting, by the NMS, a vendor identity request for vendors of base stations managed by the first EMS to the first EMS;
    transmitting, by the NMS, a vendor identity request for vendors of base stations managed by the second EMS to the second EMS;
    receiving, by the NMS, a first vendor identity for a target base station from the first EMS;
    receiving, by the NMS, a second vendor identity for a source base station from the second EMS;
    comparing the first vendor identity to the second vendor identity;
    when the first vendor identity is different from the second vendor identity, comparing ,by the NMS, a first cell identifier of a target cell used by the target base station to a second cell identifier of the target cell used by the source base station;
    determining a discrepancy between the first cell identifier and the second cell identifier; and
    replacing one of the first and second cell identifiers with the other of the first and second cell identifiers to resolve the discrepancy.

2. The method of claim 1, further comprising:
    comparing a level of handover failures from a source cell to the target cell to a predetermined value,
    wherein the vendor identity requests are only transmitted when the level of handover failures is at least the predetermined value.

3. The method of claim 1, wherein the vendor identity requests are transmitted at a predetermined time interval.

4. The method of claim 2, wherein the predetermined value is 100%.

5. The method of claim 1, wherein the first and second vendor identities are Tracking Area Codes (TACs).

6. The method of claim 5, wherein replacing one of the first and second cell identifiers includes replacing a TAC used to identify the target cell by the second vendor with a TAC used to identify the target cell by the first vendor.

7. The method of claim 1, wherein the first and second cell identifiers are Physical Cell Identifiers (PCIs).

8. The method of claim 1, wherein the first vendor identity is compared to the second vendor identity by the NMS.

9. The method of claim 1, further comprising:
    determining whether a change was made to the target base station or the source base station within a previous time interval,
    wherein the NMS compares the first cell identifier to the second cell identifier when changes were made to one of the target and source base stations within the previous time interval.

10. The method of claim 9, wherein the first and second cell identifiers are TACs, and the change includes resetting one of the target and source base stations.

11. The method of claim 9, wherein the first and second cell identifiers are PCIs, and the change includes installing one of the target and source base stations.

12. A heterogeneous cellular telecommunications system comprising:
    a Network Management System (NMS) that transmits a first vendor identity request for vendors of base stations managed b a first EMS to the first EMS and transmits a second vendor identity request for vendors of base stations managed by a second EMS to the second EMS;
    the first EMS that transmits a first vendor identity for a target base station serving a target cell to the NMS in response to the first vendor identity request;
    the second EMS that transmits a second vendor identity for a source base station serving a source cell to the NMS in response to the second vendor identity request;
    wherein the NMS compares the first vendor identity to the second vendor identity, and when the first vendor identity is different from the second vendor identity, compares, by the NMS, a first cell identifier of the target cell used by the target base station to a second cell identifier of the target cell used by the source base station, determines a discrepancy between the first cell identifier and the second cell identifier, and replaces one of the first and second cell identifiers with the other of the first and second cell identifiers to resolve the discrepancy.

13. The system of claim 12, wherein the NMS compares a level of handover failures from the source cell to the target cell to a predetermined value, and
    wherein the NMS compares the cell identifiers when the level of handover failures is at least the predetermined value.

14. The system of claim 13, wherein the NMS transmits the first and second vendor identity requests at a predetermined time interval, and the predetermined value is 100%.

15. The system of claim 12, wherein the first and second cell identifiers are Tracking Area Codes (TACs), and
    wherein replacing one of the first and second cell identifiers includes replacing a TAC used to identify the target cell by the vendor of the source cell with a TAC used to identify the target cell by the vendor of the target cell.

16. The system of claim 12, wherein the first and second cell identifiers are Physical Cell Identifiers (PCIs), and wherein replacing one of the first and second cell identifiers includes replacing a PCI used to identify the target cell by the vendor of the source cell with a PCI used to identify the target cell by the vendor of the target cell.

17. The system of claim 12, wherein the NMS determines whether a change was made to the target base station within a previous time interval, and
wherein the NMS only compares the cell identifiers and determines the discrepancy when a change was made within the previous time interval.

18. The system of claim 17, wherein the first and second cell identifiers are TACs, and the change includes resetting the target base station.

19. The system of claim 17, wherein the first and second cell identifiers are PCIs, and the change includes installing the target base station.

20. A Network Management System (NMS) in a heterogeneous cellular telecommunications network, the NMS comprising a non-transitory computer readable medium with computer executable instructions stored thereon that, when executed by a processor, perform the following method:
transmitting a vendor identity request for vendors of base stations managed by a first EMS to the first EMS;
transmitting a vendor identity request for vendors of base stations managed by a second EMS to the second EMS;
comparing a first vendor identity received from the first EMS to a second vendor identity received from the second EMS;
when the first vendor identity is different from the second vendor identity, comparing a first cell identifier of a target cell used by the target base station to a second cell identifier of the target cell used by a source base station;
determining a discrepancy between the first cell identifier and the second cell identifier; and
replacing one of the first and second cell identifiers with the other of the first and second cell identifiers to resolve the discrepancy.

* * * * *